United States Patent
Angelini et al.

(10) Patent No.: US 10,271,190 B2
(45) Date of Patent: Apr. 23, 2019

(54) LOW ENERGY BEACON CONFIGURATION ON TAP

(71) Applicant: QUALCOMM Incorporated, San Diego, CA (US)

(72) Inventors: Donato Angelini, Cambridge (GB); Pascal Chapelot, Cambridge (GB); Samson Pynadath, Cambridge (GB); Jatinderjit Singh, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/583,671

(22) Filed: May 1, 2017

(65) Prior Publication Data

US 2018/0317041 A1 Nov. 1, 2018

(51) Int. Cl.
| | |
|---|---|
| *H04W 4/80* | (2018.01) |
| *H04W 4/021* | (2018.01) |
| *H04W 8/22* | (2009.01) |
| *H04L 29/08* | (2006.01) |
| *H04W 4/02* | (2018.01) |
| *H04L 12/24* | (2006.01) |
| *H04L 29/06* | (2006.01) |

(52) U.S. Cl.
CPC ........... *H04W 4/80* (2018.02); *H04L 41/0809* (2013.01); *H04L 67/18* (2013.01); *H04L 67/34* (2013.01); *H04W 4/021* (2013.01); *H04W 4/023* (2013.01); *H04W 8/22* (2013.01); *H04L 41/0843* (2013.01); *H04L 69/28* (2013.01)

(58) Field of Classification Search
CPC ....... H04W 4/008; H04W 4/021; H04W 8/22; H04W 4/80; H04L 41/0809; H04L 67/18; H04L 67/34; H04L 41/0843; H04L 69/28

USPC ........................................................ 455/41.1
See application file for complete search history.

(56) References Cited

U.S. PATENT DOCUMENTS

| | | | |
|---|---|---|---|
| 8,432,261 | B2 | 4/2013 | Talty et al. |
| 9,106,275 | B2 | 8/2015 | Griffin et al. |

(Continued)

FOREIGN PATENT DOCUMENTS

| | | |
|---|---|---|
| WO | WO-2016043663 A1 | 3/2016 |
| WO | 2016108075 A1 | 7/2016 |
| WO | 2016109455 A1 | 7/2016 |

OTHER PUBLICATIONS

Partial International Search Report—PCT/US2018/024106—ISA/EPO—dated Jun. 18, 2018.

(Continued)

*Primary Examiner* — Eugene Yun
(74) *Attorney, Agent, or Firm* — Arent Fox, LLP and Qualcomm, Incorporated

(57) ABSTRACT

Using Bluetooth low energy beaconing to send small amounts of data without establishing a connection works fine for simple beaconing settings, but becomes complex for more complicated beaconing settings. The apparatus may be configured to receive a notification from a wireless device indicating a presence of a wireless device. The apparatus may also be configured to determine at least one of a set of beacon parameters or a beacon content after receiving the notification indicating the presence of the wireless device. Additionally, the apparatus may be configured to transmit a beacon to the wireless device based on the determined at least one of the set of beacon parameters or the beacon content.

32 Claims, 6 Drawing Sheets

(56) References Cited

U.S. PATENT DOCUMENTS

| | | | |
|---|---|---|---|
| 2005/0003774 A1* | 1/2005 | Austman | G01S 1/024 |
| | | | 455/151.2 |
| 2009/0017861 A1* | 1/2009 | Wu | H04W 52/246 |
| | | | 455/522 |
| 2015/0195008 A1 | 7/2015 | Johnson et al. | |
| 2015/0237593 A1* | 8/2015 | D'Argenio | H04W 64/00 |
| | | | 455/456.1 |
| 2015/0341856 A1* | 11/2015 | Nord | H04W 52/0212 |
| | | | 455/426.1 |
| 2015/0350910 A1 | 12/2015 | Eramian et al. | |
| 2015/0382150 A1 | 12/2015 | Ansermet et al. | |
| 2016/0057790 A1 | 2/2016 | Sim et al. | |
| 2016/0192301 A1 | 6/2016 | Sampath et al. | |
| 2017/0094445 A1 | 3/2017 | Shanmugam et al. | |

OTHER PUBLICATIONS

International Search Report and Written Opinion—PCT/US2018/024106—ISA/EPO—dated Sep. 20, 2018.

* cited by examiner

LOW ENERGY BEACON CONFIGURATION ON TAP

BACKGROUND

Field

The present disclosure relates generally to communication systems, and more particularly, to a beacon transmission.

Background

Wireless communication systems are widely deployed to provide various telecommunication services such as telephony, video, data, messaging, and broadcasts. Certain wireless communication systems may include a Bluetooth communication system. Bluetooth is a wireless communication standard. The Bluetooth standard may generally be intended for exchanging data over short distances. For example, Class 3 radios may have a range of up to approximately 3 feet (1 meter). Class 2 radios may have a range of up to approximately 33 feet (10 meters). Class 1 radios may have a range of approximately 300 feet (100 meters).

Devices implementing the Bluetooth standard may use short-wavelength ultra-high frequency (UHF) radio waves in the industrial, scientific and medical (ISM) band, e.g., from 2.4 GHz to 2.485 GHz. Bluetooth may be used to set up personal area networks (PANs) for various devices. The devices may be fixed devices, mobile devices, or some combination of fixed and mobile devices. Accordingly, Bluetooth may provide a wireless alternative to data cables. In some examples, Bluetooth may connect, for example, up to seven devices.

Bluetooth low energy (BLE) beaconing may be used to send small amounts of data without the need to establish a connection. Using BLE beaconing to send small amounts of data without establishing a connection works fine for simple beaconing settings such as receive all beacons or do not receive any beacons.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

As discussed above, BLE beaconing may be used to send small amounts of data without the need to establish a connection. Using BLE beaconing without establishing a connection becomes complex for more complicated beaconing settings, e.g., beaconing based on location, sender, context, content, time of day, personal priority, or other more complicated beaconing settings. The complexity may be due to a user needing to go through all broadcast beacon services to choose which broadcast beaconing services to select based on the user's intent or need. Given that a broadcast beacon services is not a "push" service, the beacon service does not target a customer's specific intent or need.

The systems and methods described herein include techniques that may trigger a BLE beacon transmission based on an interaction between two devices. One device may interact with another device in an interaction that may be referred to as a "tap." The "tap" may be defined as a temporary contact or a temporary approach between a first device, e.g., a BLE beacon sender, and a second device, e.g., a BLE beacon receiver. The first device, e.g., the beaconing device, may be capable of detecting a tap through some mechanisms such as, but not limited to, an NFC interaction (e.g. NFC field detection) or motion detection using an internal accelerometer. The first device may transmit a beacon to a wireless device.

In an aspect of the disclosure, a method, a computer-readable medium, and an apparatus are provided. The apparatus is configured to receive a notification from a wireless device indicating a presence of the wireless device. The apparatus is also configured to determine at least one of a set of beacon parameters or a beacon content after receiving the notification indicating the presence of the wireless device. Additionally, the apparatus is configured to transmit a beacon to the wireless device based on the determined at least one of the set of beacon parameters or the beacon content. (In an aspect, the apparatus may transmit a beacon to any device in an area. The wireless device may be in the area and may receive the beacon.)

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
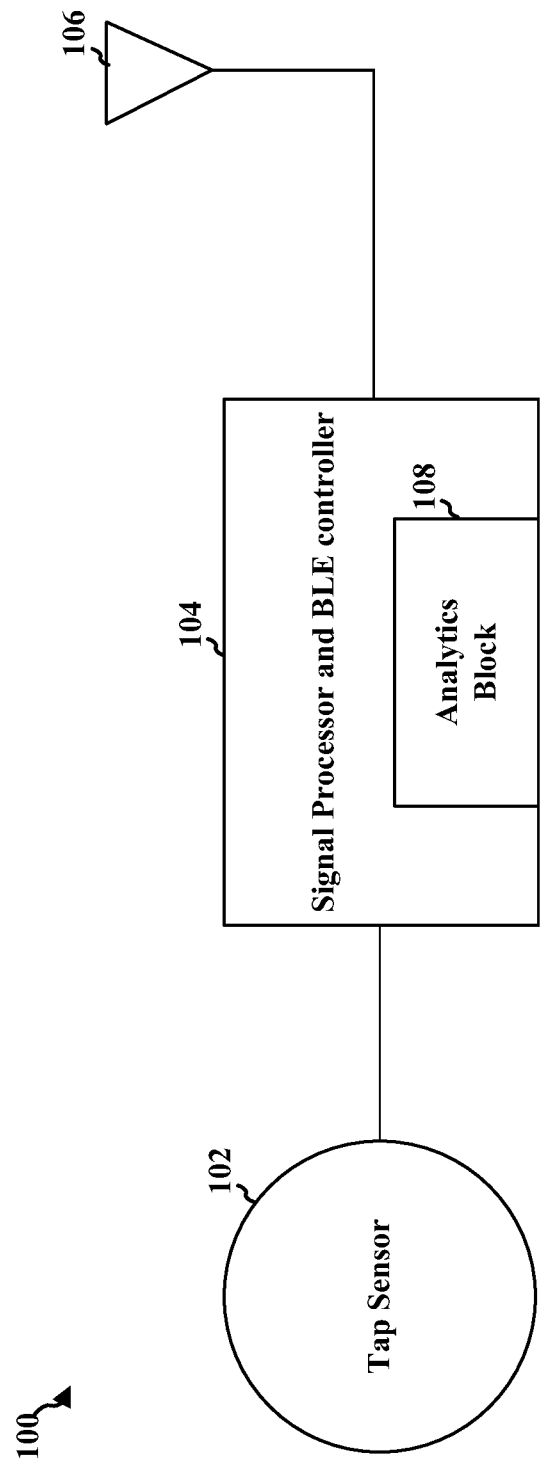
FIG. 1 is a diagram illustrating an example of a beaconing device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a beaconing device 100. The beaconing device 100 illustrated in FIG. 1 may include a tap sensor 102, a signal processor and BLE controller 104, and an antenna 106. The signal processor and BLE controller 104 may include an analytics block 108. The tap sensor 102 is coupled to the signal processor and BLE controller 104. Accordingly, the tap sensor 102 may indicate to the signal processor and BLE controller 104 that another device has been brought into close proximity of the beaconing device 100 or that another device has "tapped" the beaconing device 100. For example, the tap sensor of one beaconing device 100 may receive signals from another beaconing device 100. The antenna 106 is also coupled to the signal processor and BLE controller 104. Accordingly, the signal processor and BLE controller 104 may be able to generate signals that may be transmitted using the antenna 106. The signal processor and BLE controller 104 may also receive signals through the antenna 106 and process the received signals.

The analytics block 108 may perform analytics on data received. The analytics may include an analysis of data, e.g., data received from a notification or over one or more beacons after one or more taps. The analytics may be applied to large sets of data, e.g., after receiving data from a number of notifications and/or beacons from a large number of taps. The analytics block 108 may collect information about how often device taps occur, when device taps occur, what kind of users perform taps, or other tap related information.

In an aspect, the beaconing device 100 may implement a Bluetooth device. As discussed above, devices implementing the Bluetooth standard may use short-wavelength UHF radio waves in the ISM band to set up PANs for various devices. For example, the Bluetooth standard may be used to set up PANs for devices such as the beaconing device 100 illustrated in FIG. 1.

Bluetooth devices may include a feature referred to as a Bluetooth low energy (BLE) beacon. BLE beacons may be used to broadcast an identifier for the beaconing device 100 to nearby portable electronic devices, e.g., other beaconing devices 100, other portable electronic devices implementing Bluetooth, or other communication devices, such as mobile telephone handsets, smart phones, tablets, or other devices. Bluetooth may allow mobile telephone handsets, smartphones, tablets, and other devices to perform actions when in close proximity to a beacon.

In an aspect, BLE beaconing may be used to send a small amount of data from one device to another device. For example, BLE beaconing may be used to send a small amount of data from one beaconing device 100 to another beaconing device 100. Using BLE beaconing may allow data to be sent between devices without the need to establish a connection between a sending device and a receiving device. For example, one beaconing device 100 may send a small amount of data in a transmitted beacon without establishing a connection with another particular beaconing device 100. Sending small amounts of data using BLE, beaconing may be used for product advertisements when customers walk into a specified zone or for pushing information for other services, such as Bluetooth pairing. In an example, the information may be sent when solicited by another device. The BLE beacons may also be configured to be sent in an unsolicited manner by allowing the receiving device to control the receipt of the broadcasted beacons. Systems configured to transmit unsolicited BLE beacons may also be configured to allow a receiving device to choose to receive or choose not receive the unsolicited BLE beacons. Solicited may mean that a person using a device wants to receive something. Unsolicited may mean that every device within range may receive information without requesting the information.

Sending solicited BLE beacons or unsolicited BLE beacons as described above may work when a user's intentions are binary, e.g., one of two states such as receive all BLE beacons or do not receive any BLE beacons. Sending solicited BLE beacons or unsolicited BLE beacons as described above may also work for high-level beacon reception configurations such as receiving beacons from a certain sender or not receiving beacons from the certain sender.

BLE beaconing may become complex when more complicated beacon options need to be chosen. The more complicated options may be based on various factors such as, but not limited to, location of the beacon, beacon sender, beacon context, beacon content, time of the day, personal priority, or other BLE beaconing options. Additionally, the more complicated BLE beaconing options may provide services that may be the same or similar to a push-to-the-user service rather than a pulled with user's intent service. Because the service is a "push" service, rather than a "pull" service, the beacon service providers cannot target customers with specific intent or need. Accordingly, the more complicated BLE beaconing options may be more complex because a user may need to go through all of the broadcast beacon services to choose which beacon services the user wants to accept.

Rather than require a user to pick or decline which beacon services the user wants to use, the systems and methods described herein may define an interaction to trigger the transmission of BLE beacons and/or to modify one or more parameters of the beacon. An aspect of the systems and methods described herein may define an interaction used as a trigger for a BLE beacon transmission state change. The interaction may be referred as a "tap." The tap may be defined as a temporary contact or approach between a BLE beacon sender (e.g., a beaconing device 100) and a BLE beacon receiver (e.g., another beaconing device 100).

In an aspect, a tap may be defined as one beaconing device 100 (or other electronic device) coming into close proximity to another beaconing device 100 (or other electronic device). The tap may be used to demonstrate an intent to receive beacons. A tap may include one device physically touching another device, one device coming within a certain minimum distance of another device, or one device coming close enough to another device for a signal from one of the devices to have a signal strength above a threshold when the signal is received by the other device. In some aspects, the distances involved may be relative to the tap sensor 102 of one of the devices. The tap sensor 102 of one beaconing device 100 may receive a signal from another beaconing device 100.

In an aspect, a BLE beacon may be transmitted based on occurrence of a near field communications (NFC) tap. Using a tap may reduce the complexity of setting up BLE beaconing transmissions. For example, an NFC tap may be used to indicate a device's intent to receive beacons from another device for a specific purpose. In an aspect, the tap may indicate a device's intent to receive beacons for a specified period. A tap may be more intuitive and simpler than using a list of services or other mechanism to select BLE beaconing services. The tap mechanism may also allow a beacon service provider to collect analytics to enhance customer experience and reach the target customers efficiently. The analytics may include an analysis of data, e.g., data received from a notification or over one or more beacons after one or more taps. The analytics may be applied to large sets of data, e.g., after receiving data from a number of beacons from a large number of taps.

In an aspect, the beaconing device 100 may be capable of detecting the tap through mechanisms such as (but not limited to) NFC interaction (e.g. NFC field detection) or motion detection using an internal accelerometer.

In an aspect, the beaconing device 100 may be capable of storing information regarding the transactions, e.g. number of taps detected so far, number of failed tap attempts and information about the other device such as Bluetooth address, device manufacturer, or other parameters related to the other beaconing device 100.

Figure 2:
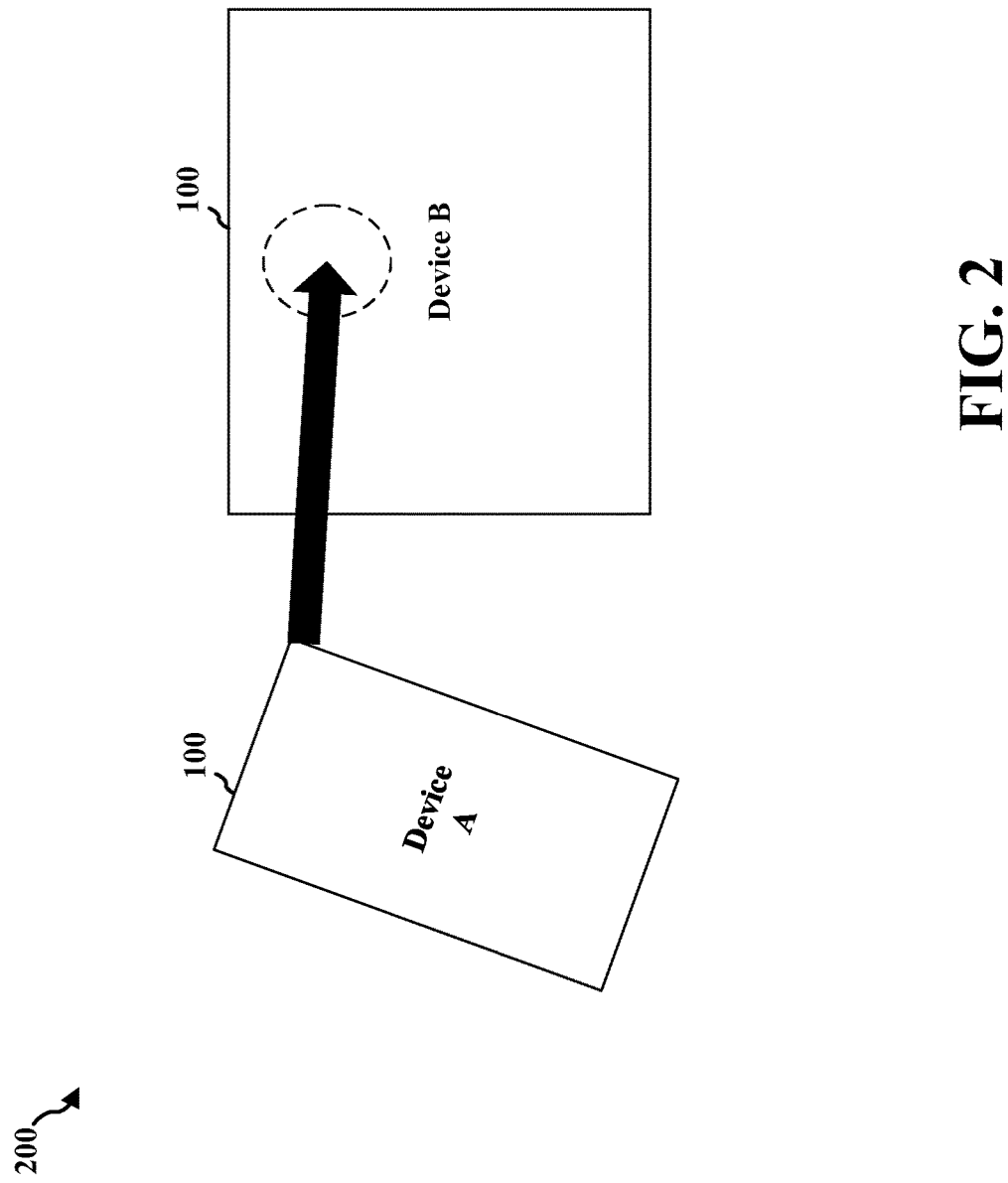
FIG. 2 is a diagram illustrating an example of interactions between two beaconing device.

FIG. 2 is a diagram illustrating an example of interactions 200 between two beaconing devices 100 further labeled as "Device A" and "Device B." In the example of FIG. 2, Device A and Device B are indicated as being beaconing devices 100. In other examples, one device may be a beaconing device 100, while the other device may be some other electronic device.

In an aspect, Device A may be a beacon-receiving device. Device B may be a beacon sending (transmitting) device. In some examples, beaconing devices 100 may be configured to both send beacons and receive beacons. In other examples, beacon-sending devices may be separate from beacon receiving devices.

A device interaction is illustrated in FIG. 2. Device A (the beacon receiver) may come into proximity of Device B (the beacon sender). In an aspect, Device B may or may not have a dedicated area on the device for tap detection, e.g., an area that may be marked on the device to indicate where a user should tap the device. The area may be proximal to the tap sensor 102. In an aspect, Device A and Device B may make physical contact (even though physical contact may not be necessary for a tap, e.g., depending on the detection technology used).

Referring to FIG. 2, in some cases, Device A and/or Device B may exchange information during the tap. In some cases, Device A and/or Device B may not exchange information during the tap. For example, in some cases, NFC may be used to transfer the BLE addresses and device names of both devices (Device A and Device B). In some cases, NFC may be used to transfer the BLE address and device name of one device (Device A or Device B) using a Connection Handover. A Connection Handover may be a protocol specified in NFC specifications for devices to communicate between, for example, Bluetooth and NFC. Connection Handover may be to handover from NFC to Bluetooth, for example. Accordingly, in some cases, the information of each device may be exchanged. In other cases, just information from one device may be acquired by the other device.

In an aspect, Device B may be configured to use a Static Handover (e.g., a one-way device address exchange) and send Device B's BLE information to Device A. Device A may use the BLE information to receive the BLE beacon from Device B. When Device A is configured as a beacon sender and Device B is configured as a beacon receiver, Device B may be configured to use Static Handover and send Device B's BLE information to Device A. Device A may use Device B's BLE information to send a BLE directed advertising packet (instead of an undirected advertising packet) containing the beacon. In some examples, when an address, e.g., a Bluetooth address, is sent a directed beacon may be used. A static handover the DME information of one of the device, e.g., Device A, may be sent to the other device, e.g., Device B, but not from Device B back to Device A. Alternatively, in a static handover the DME information of one of the device, e.g., Device B, may be sent to the other device, e.g., Device A, but not from Device A back to Device B. Accordingly, the static handover may be the converse of a dynamic handover. The dynamic handover is a two way link, e.g., over the NSB channel. Dynamic handovers may be more secure because devices may use and exchange keys in the dynamic handover.

In an aspect, Device B may be configured to use a Negotiated Handover (e.g., a device address exchange using a link key) as a requestor and to initiate a Negotiated Handover transaction by sending a Handover Request with Device B's BLE information. Device A may receive the message and send a Handover Select with Device A's BLE information and use Device B's information to receive the BLE beacon from Device B. Device B receives Device A's BLE information and sends a BLE directed advertising packet (e.g., in place of an undirected advertising packet) containing the beacon.

In an aspect, Device A may be configured to use a Negotiated Handover as a requestor and to initiate a Negotiated Handover transaction by sending a Handover Request with Device A's BLE information. Device B may receive the message and send a Handover Select with Device B's BLE information. Device B may interpret the received Device A BLE information as indicating that "Device A supports BLE beacon reception and is ready to receive a directed advertising packet containing a BLE beacon." Both Device A and Device B may store the transaction and each other's information, if available.

In an aspect, a detection area, e.g., an area proximal to the tap sensor 102, when the tap sensor 102 is present, may be identified by a dashed line or a symbol proximal to the tap sensor. The tap interaction may be used by Device B as a trigger to switch from a default configuration to a temporary configuration. When a tap occurs, Device B may use an alternative configuration different from the default configuration. In particular, Device B may modify one or more parameters like TX power, toggling the BLE beacon activation, BLE beacon period or content when using the alternative configuration.

Figure 3:
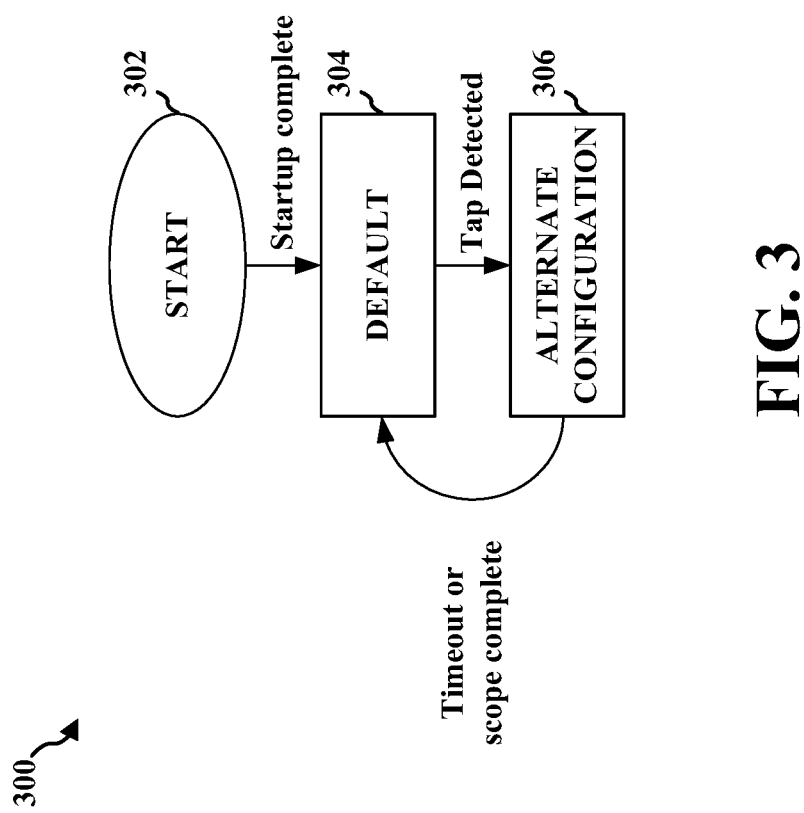
FIG. 3 is a flowchart of a method of wireless communication.

FIG. 3 is a flowchart 300 of a method of wireless communication. FIG. 3 may be discussed with respect to the devices of FIG. 2 (Device A and Device B) which may be beaconing devices 100. For example, the method may begin at start 302. Device B may be configured during the start 302 operation and then may proceed to the default state 304 when the startup is complete. Device B may wait in the default state 304 until a tap is detected.

A tap may be detected using the tap sensor 102. Signal processing using the signal processor in the signal processor and BLE controller 104 may be used to reduce false tap detections. For example, the signal processor may perform a digital filtering of input signals from the tap sensor 102. The digital filtering may filter out low false tap detection signals. For example, the signal processor may implement a low pass filter to filter out short term transient noise that might otherwise be interpret as a tap detection. When a tap is detected, Device B may switch to the Alternate Configuration 306 state.

In an aspect, Device A and/or Device B may store information regarding the transaction and/or another device. Device B may eventually use Device A's BLE information (if received) to send a BLE directed advertising packet for transmission via the BLE beacons. Device B may stop sending BLE beacons and return to the DEFAULT state if the scope of the beacon is completed (e.g. Bluetooth pairing is completed) or after a timeout expiration. For example, the alternate configuration 306 may be a temporary state for, e.g., Bluetooth pairing, other configuration, or some other process. Furthermore, in some cases, the alternate configuration 306 may time out before the process is complete, e.g., before a Bluetooth pairing occurs. For example, a tap may occur but be followed by two devices being separated before a pairing can occur. Accordingly, the alternate configuration 306 may time out and the device may return to the default state 304.

Figure 4:
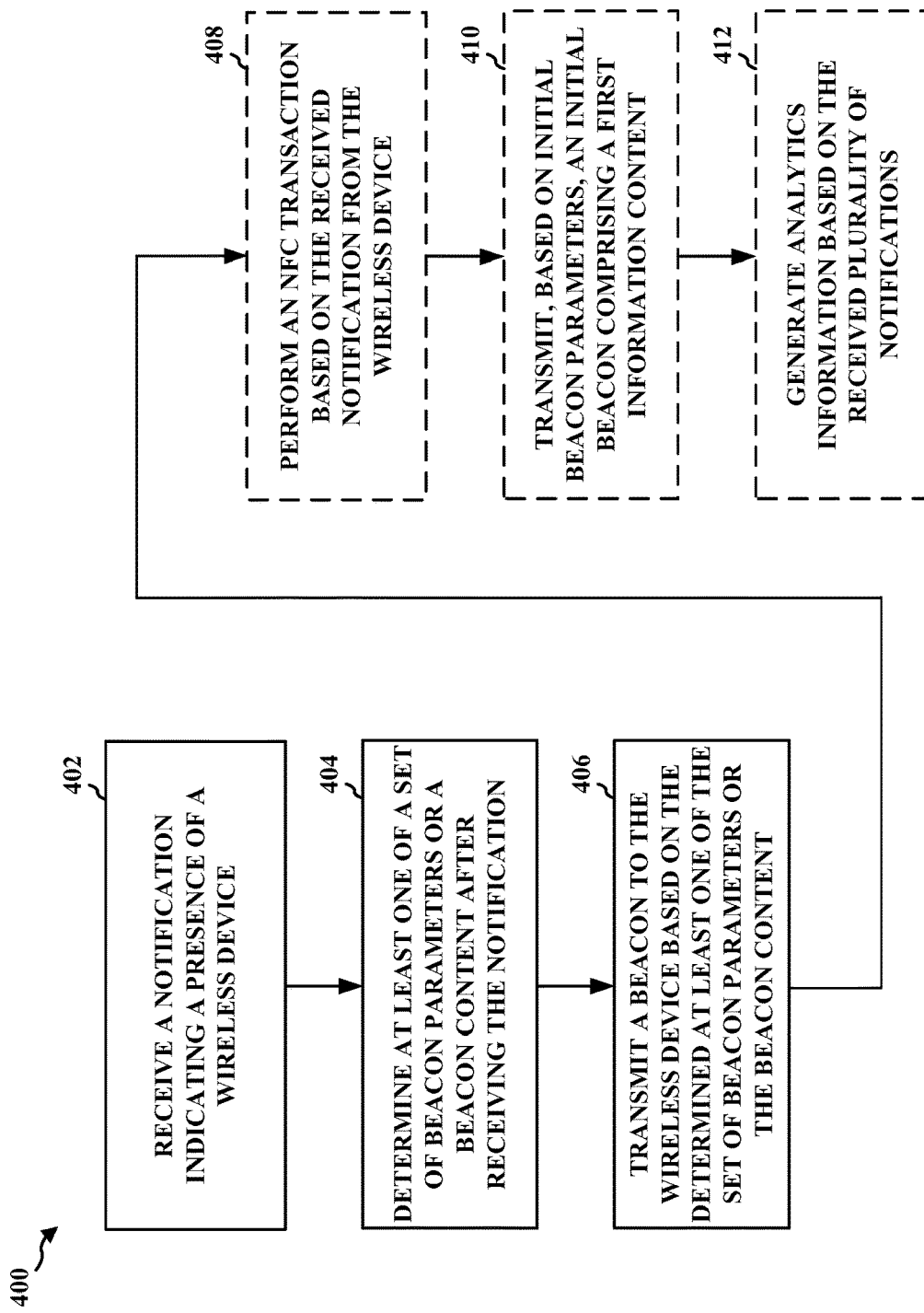
FIG. 4 is another flowchart of a method of wireless communication.

FIG. 4 is a flowchart 400 of a method of wireless communication. The method may be performed by a beaconing device or some other device (e.g., the beaconing device 100, the apparatus 502/502', or another device). At 402, the beaconing device or other device receives a notification from a wireless device indicating a presence of the wireless device. For example, the beaconing device 100, the apparatus 502/502', or another device receives a notification from a wireless device indicating a presence of the wireless device.

In an aspect, the notification may be triggered by a NFC field detect.

In an aspect, the notification may include a Bluetooth address or a device name of a wireless device, e.g., the wireless device (which may be a beaconing device 100) sending the notification to the beaconing device 100 implementing the method. Additionally, a transmitted beacon, e.g., from the beaconing device 100 implementing the method, may include the Bluetooth address or the device name of the wireless device.

In an aspect, the notification may be based on a detection of a physical object within a vicinity, e.g., proximal to the tap sensor 102 of a beaconing device 100.

At 404, the beaconing device or other device determines at least one of a set of beacon parameters or a beacon content after receives the notification indicating the presence of the wireless device. For example, the beaconing device 100, the apparatus 502/502', or another device determines at least one of a set of beacon parameters or a beacon content after receiving the notification indicating the presence of the wireless device. In an aspect, the set of beacon parameters may include a beacon transmit power, a beacon periodicity, a beacon recipient address, a recipient device name, and a beacon transmission duration. The at least one of the set of beacon parameters or the beacon content may be determined based on the physical contact of two devices, such as Device A and Device B (or devices coming into close proximity to each other) via the NFC field detect. In an aspect, beacon parameters may include power level used for a transmission of a beacon. In another aspect, preferences such as a kind of offer or kind of information requested may be a beaconing parameter.

In an aspect, the notification may include a request for information. If so, the beacon content includes the requested information.

At 406, the beaconing device or other device transmits a beacon to the wireless device based on the determined at least one of the set of beacon parameters or the beacon content. For example, the beaconing device 100, the apparatus 502/502' or another device transmits a beacon to the wireless device based on the determined at least one of the set of beacon parameters or the beacon content. The transmitted beacon may be a BLE beacon.

In an aspect, the notification may indicate an intent of the wireless device to receive beacons for a period of time. The beaconing device may transmit a beacon at a periodicity for the period of time.

At 408, the beaconing device or other device may optionally perform an NFC transaction based on the received notification from the wireless device. For example, the beaconing device 100, the apparatus 502/502', or another device may optionally perform an NFC transaction based on the received notification from the wireless device. The NFC may be an indication that one device, e.g., Device A has come into close proximity to another device, e.g., Device B. Close proximity may be a distance that corresponds to a range of a tap sensor of a particular device or devices. Close proximity may be a range between the range of a tap sensor and a 0 distance between the devices (Device A and Device B).

At 410, the beaconing device or other device may optionally transmit, based on initial beacon parameters, an initial beacon including a first information content. (It will be understood that the flow chart is not necessarily presented in order. The initial beacon may generally be the first beacon transmission in some series of beacon despite not being the first beacon transmission in the flow chart.) For example, the beaconing device 100, the apparatus 502/502' or another device may optionally transmit, based on initial beacon parameters, an initial beacon including a first information content.

At 412, the beaconing device or other device may optionally generate analytics information based on the received plurality of notifications. For example, the beaconing device 100, the apparatus 502/502', or another device may optionally generate analytics information based on the received plurality of notifications. The analytics may include an analysis of data, e.g., data received in a notification or over one or more beacons after one or more taps.

Figure 5:
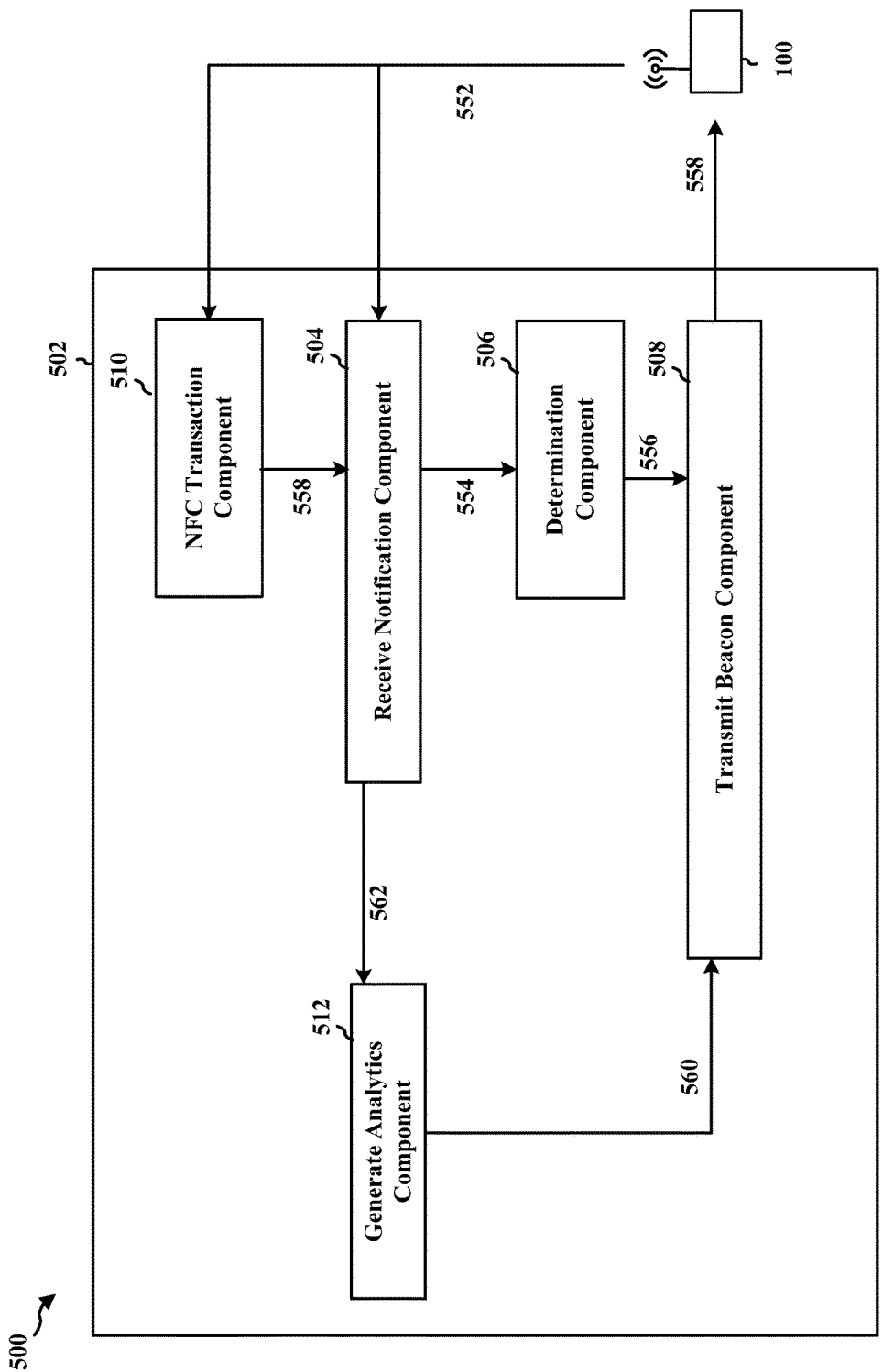
FIG. 5 is a conceptual data flow diagram illustrating the data flow between different means/components in an exemplary apparatus.

FIG. 5 is a conceptual data flow diagram 500 illustrating the data flow between different means/components in an exemplary apparatus 502. The apparatus 502 may be the beaconing device 100 of FIG. 1 or another device. The apparatus 502 includes a component 504 that receives a notification 552 indicating a presence of a wireless device. The apparatus 502 also includes a component 506 that determines at least one of a set of beacon parameters or a beacon content after receiving the notification 552 from the component 504 (signal 554 passing the received notification to the determination component 506) indicating the presence of the wireless device. Additionally, the apparatus 502 includes a transmit beacon component 508 that transmits a beacon 558 to a wireless device (e.g., beaconing device 100) based on the determined at least one of the set of beacon parameters or the beacon content passed from the determination component to the transmit beacon component via signal 556. Additionally, the apparatus 502 includes a NFC transaction component 510 that performs an NFC transaction based on the received notification 552 from the wireless device. The NFC transaction may be a tap transaction. The apparatus 502 also includes a generate analytics component 512 that generates analytics information 560 based on a plurality of notifications 552 received from the receive notification component 504 (notification 562 passed from the receive notification component 504 to the generate analytics component 512). In some aspects, the notifications 552 and the notifications 562 may include the same information. In some aspects, the notifications 562 may include a subset of the information in the notifications 552. The NFC Transaction Component may include or be connected to a tap sensor such as the tap sensor 102 of FIG. 1.

In an aspect, the component 504 that receives a notification 552 indicating a presence of a wireless device may receive a plurality of notifications 552 from a plurality of wireless devices. In an aspect, the transmit beacon component 508 transmits a beacon to the wireless device based on the determined at least one of the set of beacon parameters or the beacon content. Based on initial beacon parameters, an initial beacon may include a first information content. The beacon content may be determined to include a subset of the first information content. (Note, as discussed above, the flow chart does not imply a specific order.)

The apparatus may include additional components that perform each of the blocks of the algorithm in the aforementioned flowcharts of FIGS. 3-4. As such, each block in the aforementioned flowcharts of FIGS. 3-4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
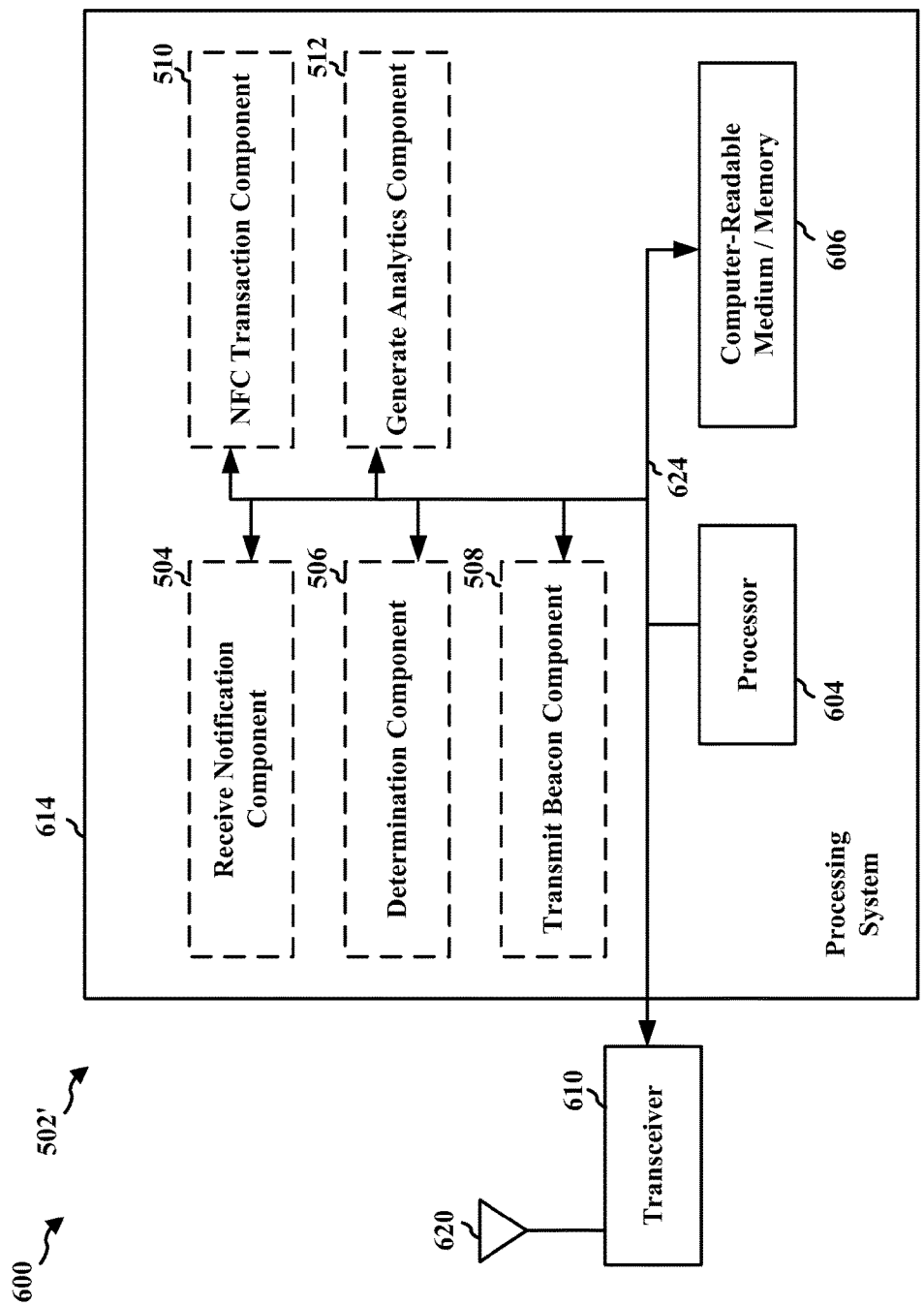
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 504, 506, 508, 510, 512 and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically a reception component, e.g., the receive notification component 504 and/or the NFC transaction component 510. As discussed above, the NFC Transaction Component may include or be connected to a tap sensor such as the tap sensor 102 of FIG. 1. In addition, the transceiver 610 receives information from the processing system 614, specifically the transmit beacon component 508, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, 508, 510, 512. The components may be software components running in the processor 604, resident/stored in the computer readable medium/memory 606, one or more hardware components coupled to the processor 604, or some combination thereof.

In one configuration, the beaconing device 100 or the apparatus 502/502' includes means for receiving a notification indicating a presence of a wireless device (e.g., the means may include the tap sensor 102, the signal processor and/or BLE controller 104, the antenna 106, and/or the receive notification component 504). The beaconing device 100 or the apparatus 502/502' also includes means for determining at least one of a set of beacon parameters or a beacon content after receiving the notification indicating the presence of the wireless device (e.g., the means for determining may include the signal processor and BLE controller 104 and/or the determination component 506; the determination component 506 may be part of the signal processor and BLE controller 104). Additionally, the beaconing device 100 or the apparatus 502/502' includes means for transmitting a beacon to the wireless device based on the determined at least one of the set of beacon parameters or the beacon content (e.g., the means for transmitting a beacon may include the signal processor and BLE controller 104, the antenna 106, and/or the transmit beacon component 508).

In an aspect, the beaconing device 100 or the apparatus 502/502' may include means for performing an NFC transaction based on the received notification from the wireless device (e.g., the means for performing the NFC transaction may include the tap sensor 102, the signal processor and BLE controller 104, and/or the NFC transaction component 510). The beaconing device 100 or the apparatus 502/502' may also include means for generating analytics information based on the received plurality of notifications (e.g., the means for generating the analytics may include the analytics block 108 and/or the generate analytics component 512; the analytics block 108 may include or be equivalent to the generate analytics component 512).

In an aspect, of the beaconing device 100 or the apparatus 502/502' the means for receiving a notification may be further configured to receive a plurality of notifications from a plurality of wireless devices In an aspect, the means for transmitting the beacon may be configured to transmit, based on initial beacon parameters, an initial beacon including a first information content The beacon content may be determined to comprise a subset of the first information content.

The aforementioned means may be one or more of the aforementioned components of the apparatus 502 and/or the processing system 614 of the apparatus 502' configured to perform the functions recited by the aforementioned means. As described supra, the processing system 614 may include the signal processor and BLE controller 104, analysis block 108. As such, in one configuration, the aforementioned means may be the processing system 614, the signal processor and BLE controller 104, analysis block 108 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
    receiving a notification from a wireless device indicating a presence of the wireless device based on a tap;
    determining a set of beacon parameters after receiving the notification indicating the presence of the wireless device;
    transmitting a beacon to the wireless device based on the determined set of beacon parameters;
    wherein the notification is triggered by a near field communication (NFC) field detect, wherein the set of beacon parameters is determined based on a contact via the NFC field detect, and wherein the transmitted beacon is a Bluetooth low energy (BLE) beacon; and
    wherein the notification indicates an intent of the wireless device to receive beacons for a period of time and wherein the beacon is transmitted at a periodicity for the period of time.

2. The method of claim 1, wherein the notification comprises a Bluetooth address or a device name of the wireless device, and wherein the transmitted beacon comprises the Bluetooth address or the device name of the wireless device.

3. The method of claim 1, wherein the notification is based on a detection of a physical object within a vicinity.

4. The method of claim 1, wherein the notification comprises a request for information, and wherein the beacon content comprises the information.

5. The method of claim 1, wherein the set of beacon parameters comprises a beacon transmit power, a beacon periodicity, a beacon recipient address, a recipient device name, and a beacon transmission duration, wherein transmitting the beacon is based on the beacon transmit power, the beacon periodicity, the beacon recipient address, the recipient device name, and the beacon transmission duration of the beacon parameters.

6. The method of claim 1, further comprising performing an NFC transaction based on the received notification from the wireless device, wherein the beacon is transmitted based on information received via the NFC transaction.

7. The method of claim 1, further comprising:
    wherein receiving the notification from the wireless device comprises receiving a plurality of notifications from a plurality of wireless devices; and
    generating analytics information based on the received plurality of notifications.

8. The method of claim 1, wherein transmitting the beacon further comprising transmitting, based on initial beacon parameters, an initial beacon comprising a first information content, wherein the beacon content is determined to comprise a subset of the first information content.

9. An apparatus for wireless communication, comprising:
    means for receiving a notification from a wireless device indicating a presence of the wireless device based on a tap;

means for determining a set of beacon parameters after receiving the notification indicating the presence of the wireless device;

means for transmitting a beacon to the wireless device based on the determined set of beacon parameters;

wherein the notification is triggered by a near field communication (NFC) field detect, wherein the set of beacon parameters is determined based on a contact via the NFC field detect, and wherein the transmitted beacon is a Bluetooth low energy (BLE) beacon; and wherein the notification indicates an intent of the wireless device to receive beacons for a period of time and wherein the beacon is transmitted at a periodicity for the period of time.

10. The apparatus of claim 9, wherein the notification comprises a Bluetooth address or a device name of the wireless device, and wherein the transmitted beacon comprises the Bluetooth address or the device name of the wireless device.

11. The apparatus of claim 9, wherein the notification is based on a detection of a physical object within a vicinity.

12. The apparatus of claim 9, wherein the notification comprises a request for information, and wherein the beacon content comprises information based on the request for information.

13. The apparatus of claim 9, wherein the set of beacon parameters comprises a beacon transmit power, a beacon periodicity, a beacon recipient address, a recipient device name, and a beacon transmission duration, wherein transmitting the beacon is based on the beacon transmit power, the beacon periodicity, the beacon recipient address, the recipient device name, and the beacon transmission duration of the beacon parameters.

14. The apparatus of claim 9, further comprising means for performing an NFC transaction based on the received notification from the wireless device, wherein the beacon is transmitted based on information received via the NFC transaction.

15. The apparatus of claim 9, further comprising:

wherein the means for receiving the notification from the wireless device is configured to receive a plurality of notifications from a plurality of wireless devices; and means for generating analytics information based on the received plurality of notifications.

16. The apparatus of claim 9, wherein the means for transmitting a beacon is further configured to transmit an initial beacon based on initial beacon parameters, the initial beacon comprising a first information content, wherein the beacon content is determined to comprise a subset of the first information content.

17. An apparatus for wireless communication, comprising:

a memory; and at least one processor coupled to the memory and configured to:

receive a notification from a wireless device indicating a presence of the wireless device based on a tap;

determine a set of beacon parameters after receiving the notification indicating the presence of the wireless device;

transmit a beacon to the wireless device based on the determined set of beacon parameters;

wherein the notification is triggered by a near field communication (NFC) field detect, wherein the set of beacon parameters is determined based on a contact via the NFC field detect, and wherein the transmitted beacon is a Bluetooth low energy (BLE) beacon; and wherein the notification indicates an intent of the wireless device to receive beacons for a period of time and wherein the beacon is transmitted at a periodicity for the received period of time.

18. The apparatus of claim 17, wherein the notification comprises a Bluetooth address or a device name of the wireless device, and wherein the transmitted beacon comprises the Bluetooth address or the device name of the wireless device.

19. The apparatus of claim 17, wherein the notification is based on a detection of a physical object within a vicinity.

20. The apparatus of claim 17, wherein the notification comprises a request for information, and wherein the beacon content comprises information based on the request for information.

21. The apparatus of claim 17, wherein the set of beacon parameters comprises a beacon transmit power, a beacon periodicity, a beacon recipient address, a recipient device name, and a beacon transmission duration, wherein transmitting the beacon is based on the beacon transmit power, the beacon periodicity, the beacon recipient address, the recipient device name, and the beacon transmission duration of the beacon parameters.

22. The apparatus of claim 17, the at least one processor further configured to perform an NFC transaction based on the received notification from the wireless device, wherein the beacon is transmitted based on information received via the NFC transaction.

23. The apparatus of claim 17, the at least one processor further configured to:

receive a plurality of notifications from a plurality of wireless devices; and generate analytics information based on the received plurality of notifications.

24. The apparatus of claim 17, the at least one processor further configured to: transmit, based on initial beacon parameters, an initial beacon comprising a first information content, wherein the beacon content is determined to comprise a subset of the first information content.

25. A non-transitory computer-readable medium storing computer executable code, comprising code to:

receive a notification from a wireless device indicating a presence of the wireless device based on a tap;

determine a set of beacon parameters after receiving the notification indicating the presence of the wireless device;

transmit a beacon to the wireless device based on the determined set of beacon parameters;

wherein the notification is triggered by a near field communication (NFC) field detect, wherein the set of beacon parameters is determined based on a contact via the NFC field detect, and wherein the transmitted beacon is a Bluetooth low energy (BLE) beacon; and wherein the notification indicates an intent of the wireless device to receive beacons for a period of time and wherein the beacon is transmitted at a periodicity for the received period of time.

26. The non-transitory computer-readable medium of claim 25, wherein the notification comprises a Bluetooth address or a device name of the wireless device, and wherein the transmitted beacon comprises the Bluetooth address or the device name of the wireless device.

27. The non-transitory computer-readable medium of claim 25, wherein the notification is based on a detection of a physical object within a vicinity.

28. The non-transitory computer-readable medium of claim 25, wherein the notification comprises a request for information, and wherein the beacon content comprises information based on the request for information.

29. The non-transitory computer-readable medium of claim 25, wherein the set of beacon parameters comprises a beacon transmit power, a beacon periodicity, a beacon recipient address, a recipient device name, and a beacon transmission duration, wherein transmitting the beacon is based on the beacon transmit power, the beacon periodicity, the beacon recipient address, the recipient device name, and the beacon transmission duration of the beacon parameters.

30. The non-transitory computer-readable medium of claim 25, further comprising code to: perform an NFC transaction based on the received notification from the wireless device, wherein the beacon is transmitted based on information received via the NFC transaction.

31. The non-transitory computer-readable medium of claim 25, further comprising code to:
receive a plurality of notifications from a plurality of wireless devices; and
generate analytics information based on the received plurality of notifications.

32. The non-transitory computer-readable medium of claim 25, further comprising code to: transmit, based on initial beacon parameters, an initial beacon comprising a first information content, wherein the beacon content is determined to comprise a subset of the first information content.

\* \* \* \* \*